United States Patent
Irrgang et al.

(10) Patent No.: US 8,952,799 B2
(45) Date of Patent: Feb. 10, 2015

(54) METHOD AND SYSTEM FOR WARNING A DRIVER OF A VEHICLE ABOUT POTENTIAL OBSTACLES BEHIND THE VEHICLE

(75) Inventors: Peter Irrgang, Achberg (DE); Steven Gerd Kanzler, Lindau (DE); Andreas Schlensag, Wangen im Allgaeu (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 202 days.

(21) Appl. No.: 13/445,337

(22) Filed: Apr. 12, 2012

(65) Prior Publication Data

US 2012/0262284 A1    Oct. 18, 2012

(30) Foreign Application Priority Data

Apr. 12, 2011 (DE) .......................... 10 2011 016 758
Jul. 21, 2011 (DE) .......................... 10 2011 108 283

(51) Int. Cl.
| | | |
|---|---|---|
| B60Q 1/00 | (2006.01) | |
| G08G 1/16 | (2006.01) | |
| B60W 30/095 | (2012.01) | |
| B60W 50/14 | (2012.01) | |
| B60W 30/18 | (2012.01) | |

(52) U.S. Cl.
CPC ........... *G08G 1/168* (2013.01); *B60W 30/0956* (2013.01); *B60W 50/14* (2013.01); *B60W 30/18036* (2013.01); *B60W 2540/18* (2013.01); *B60W 2550/10* (2013.01); *B60W 2550/302* (2013.01); *B60W 2550/306* (2013.01)
USPC ........... 340/435; 340/933; 340/937; 340/436; 340/438

(58) Field of Classification Search
CPC ............. G08G 1/168; B60W 30/0956; B60W 30/18036; B60W 2540/18
USPC .......................... 340/933, 937, 435, 436, 438
See application file for complete search history.

(56) References Cited

U.S. PATENT DOCUMENTS

| | | | |
|---|---|---|---|
| 5,008,678 A | 4/1991 | Herman | |
| 5,940,011 A | 8/1999 | Agravante et al. | |
| 7,385,486 B2 | 6/2008 | Danz et al. | |
| 7,663,533 B2 | 2/2010 | Toennesen et al. | |
| 2006/0271299 A1* | 11/2006 | Ward et al. .......... | 702/6 |
| 2008/0211644 A1 | 9/2008 | Buckley et al. | |
| 2010/0141414 A1* | 6/2010 | Matsumoto et al. .......... | 340/435 |
| 2010/0245573 A1* | 9/2010 | Gomi et al. .................. | 348/148 |

FOREIGN PATENT DOCUMENTS

| | | |
|---|---|---|
| DE | 103 52 800 | 6/2005 |
| DE | 102006032541 | 1/2008 |

OTHER PUBLICATIONS

German Patent and Trademark Office, German Examination Report, Feb. 16, 2012, German Patent Application 10 2011 108 283.6, with partial English translation.

* cited by examiner

*Primary Examiner* — Daryl Pope
(74) *Attorney, Agent, or Firm* — W. F. Fasse

(57) ABSTRACT

A method and system produce a warning signal to warn a driver of a vehicle about a potential obstacle crossing behind the vehicle, for example as the vehicle is backing out of a parking space. The system and method use a sensor to detect, monitor and track the position and velocity of a potential obstacle relative to the subject vehicle, in a detection space behind and to the sides of the vehicle, preferably to predict the probability that the trajectory of the potential obstacle will intersect with the trajectory of the subject vehicle at a critical time.

18 Claims, 4 Drawing Sheets

METHOD AND SYSTEM FOR WARNING A DRIVER OF A VEHICLE ABOUT POTENTIAL OBSTACLES BEHIND THE VEHICLE

PRIORITY CLAIM

This application is based on and claims the priority under 35 USC 119 of German Patent Application 10 2011 016 758.7 filed on Apr. 12, 2011 and German Patent Application 10 2011 108 283.6 filed on Jul. 21, 2011. The complete disclosures of the foreign priority applications are incorporated herein by reference.

FIELD OF THE INVENTION

The invention relates to a method as well as a system for warning a driver of a subject vehicle about potential obstacles such as other vehicles or pedestrians behind the subject vehicle or with the probable risk of crossing behind the subject vehicle.

BACKGROUND INFORMATION

It is known to equip a motor vehicle with a system including sensors to detect potential obstacles behind or potentially crossing behind the subject vehicle. When the subject vehicle is driving in reverse, e.g. backing out of a parking space, the known systems are intended to provide a warning to the driver of the subject vehicle if there is an obstacle behind or potentially crossing behind the subject vehicle. The known systems in modern series production motor vehicles function on the basis of a warning zone defined behind the subject vehicle. In this regard, a limited lateral or rearward zone is defined around and behind the subject vehicle. In a typical parking situation, for example when the subject vehicle is backing out of a parking space, the system will then produce a warning to the driver when an obstacle object such as a car or a motorcycle has entered completely or at least partially into this warning zone. However, in many situations, such known systems will not generate a warning early enough. For example, in the case of an obstacle vehicle that is not yet in the warning zone but is approaching this zone from the side at a high speed, such a known system that is only triggered when the obstacle vehicle reaches the warning zone, would generate the warning too late for the driver to be able to react adequately to the situation.

Another problem with known systems is that they do not take into account the approach angle of a potential obstacle vehicle that is approaching the warning zone from the side at an oblique or non-perpendicular angle. Therefore, the known systems cannot accurately predict whether a collision or time-critical intersection of the subject vehicle or its warning zone with the trajectory of the potential obstacle vehicle will occur, especially when the obstacle vehicle is approaching at an oblique angle relative to the longitudinal axis of the subject vehicle. Thus, the known systems are especially inadequate in typical angled parking situations, in which cars are parked at an oblique non-perpendicular angle relative to a roadway or a parking area lane extending behind the cars.

SUMMARY OF THE INVENTION

In view of the above, it is an object of the invention to provide an improved method and an improved apparatus or system for warning the driver of a subject vehicle about potential obstacles behind or probably crossing behind the subject vehicle. The invention further aims to provide a method and a system that can more-accurately predict the probability of a future intersection of the expected trajectory of an obstacle with the expected trajectory of the vehicle and its rearward critical zone. More particularly, the invention aims to provide a method and a system that detect, track and take into account the relative position and the relative speed, and preferably the relative angle and/or the relative distance between the potential obstacle and the subject vehicle. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a method for warning the driver of a subject vehicle about a potential obstacle behind the vehicle. The inventive method is especially based on detecting, monitoring and evaluating the relative motion of the potential obstacle, which especially involves evaluating the position and the speed of the potential obstacle relative to the subject vehicle in a detection region behind and laterally adjacent to the subject vehicle. Preferably, the evaluated relative motion of the potential obstacle further involves the distance and the approach angle of the potential obstacle relative to the subject vehicle. In further detailed embodiments, the evaluation further calculates the expected trajectory of the potential obstacle based on the approach angle, and/or determines the expected trajectory of the subject vehicle based on the steering angle of the subject vehicle for example provided by a steering angle sensor. Based on the evaluation, a warning is generated and provided to the driver of the subject vehicle, dependent on the progression of the position and speed of the potential obstacle relative to the subject vehicle in a detection region behind and laterally next to the subject vehicle. Particularly, based on the changing position and speed of the potential obstacle, a probability that the potential obstacle will cross into the critical zone encompassing and extending behind the subject vehicle, further taking into account that this critical zone is moving along with the subject vehicle, while the potential obstacle is also moving. Thus, based on the changing position and the speed, it is determined whether and when the potential obstacle will cross the critical zone. The warning is provided to the driver if it is probabilistically expected, based on the determined probability, that the potential obstacle will cross into the critical zone.

Further details of the invention, as well as preferred features of various embodiments thereof, will be disclosed in the following detailed description.

BRIEF DESCRIPTION OF THE DRAWINGS

In order that the invention may be clearly understood, it will now be described by way of example, in connection with example embodiments thereof, with reference to the accompanying drawings, wherein.

DETAILED DESCRIPTION OF PREFERRED EXAMPLE EMBODIMENTS AND THE BEST MODE OF THE INVENTION

Figure 1:
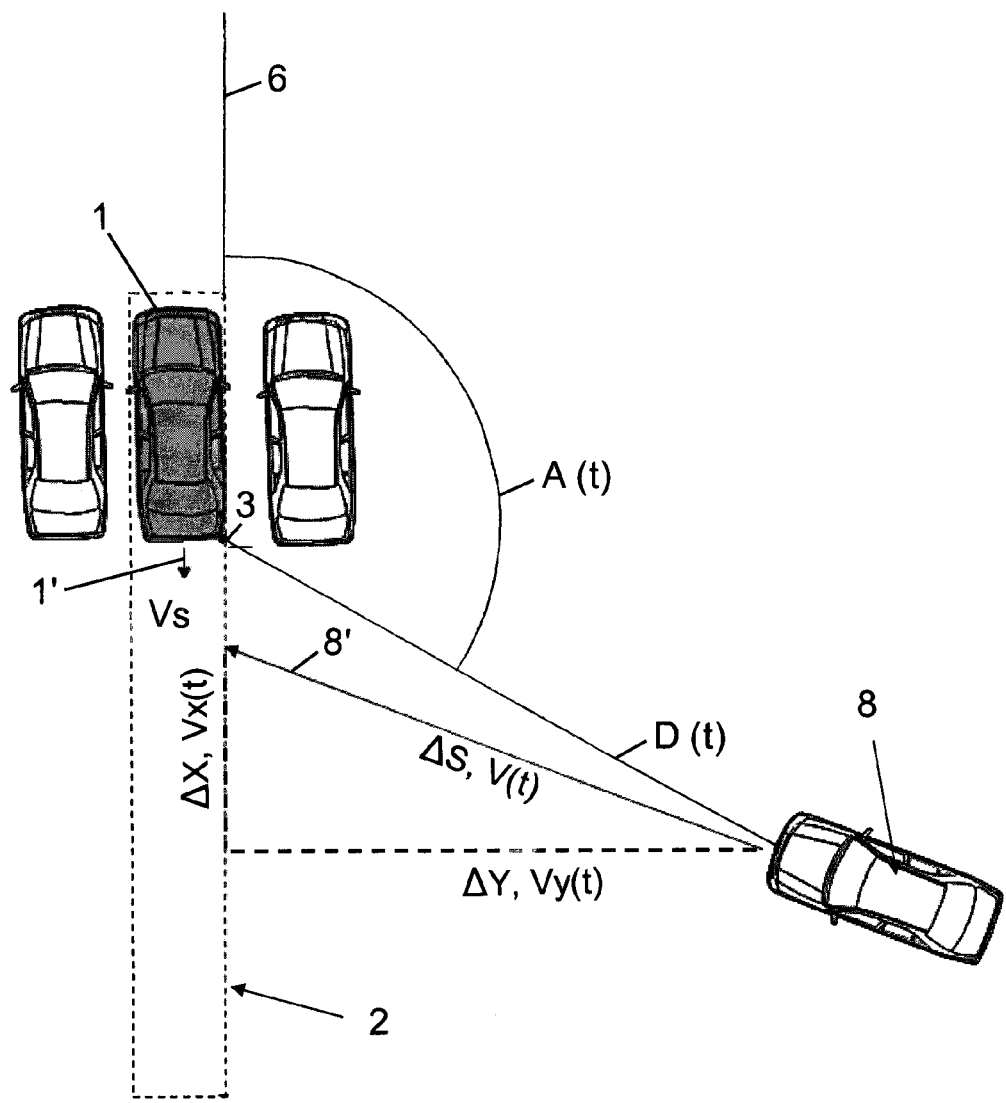
FIG. 1 is a schematic top view diagram of a potential obstacle (crossing vehicle) approaching laterally obliquely behind a parked subject vehicle equipped with a system according to the invention, for illustrating the operation of the method according to the invention.

In a preferred embodiment of the invention as shown schematically in FIG. 1, the critical zone 2 extends directly all around and behind the subject vehicle 1. The critical zone 2 is represented by dashed lines along the boundaries thereof, whereby the lateral boundaries extend along the sides of the subject vehicle 1 parallel to the longitudinal axis of the vehicle. The critical zone 2 and thus the lateral boundary lines thereof have a length preferably from 3 to 10 meters, and especially 6 meters extending behind the rear end of the vehicle, and also encompassing the vehicle itself. A length of 6 meters corresponds approximately to two typical driving lanes. It is further taken into account by the inventive system and method, that when the subject vehicle 1 is moving, i.e. if the velocity thereof is non-zero, then the critical zone 2 moves along together with the subject vehicle 1. This is important for the evaluation according to the invention, for predicting whether a collision or intersection of the critical zone 2 with the expected trajectory of a potential obstacle 8 is probabilistically expected. Namely, in a particular embodiment of the invention, the speed of the subject vehicle 1 is taken into account for determining if and when the potential obstacle 8 will cross the (moving) critical zone 2 behind and encompassing the vehicle 1.

Figure 3:
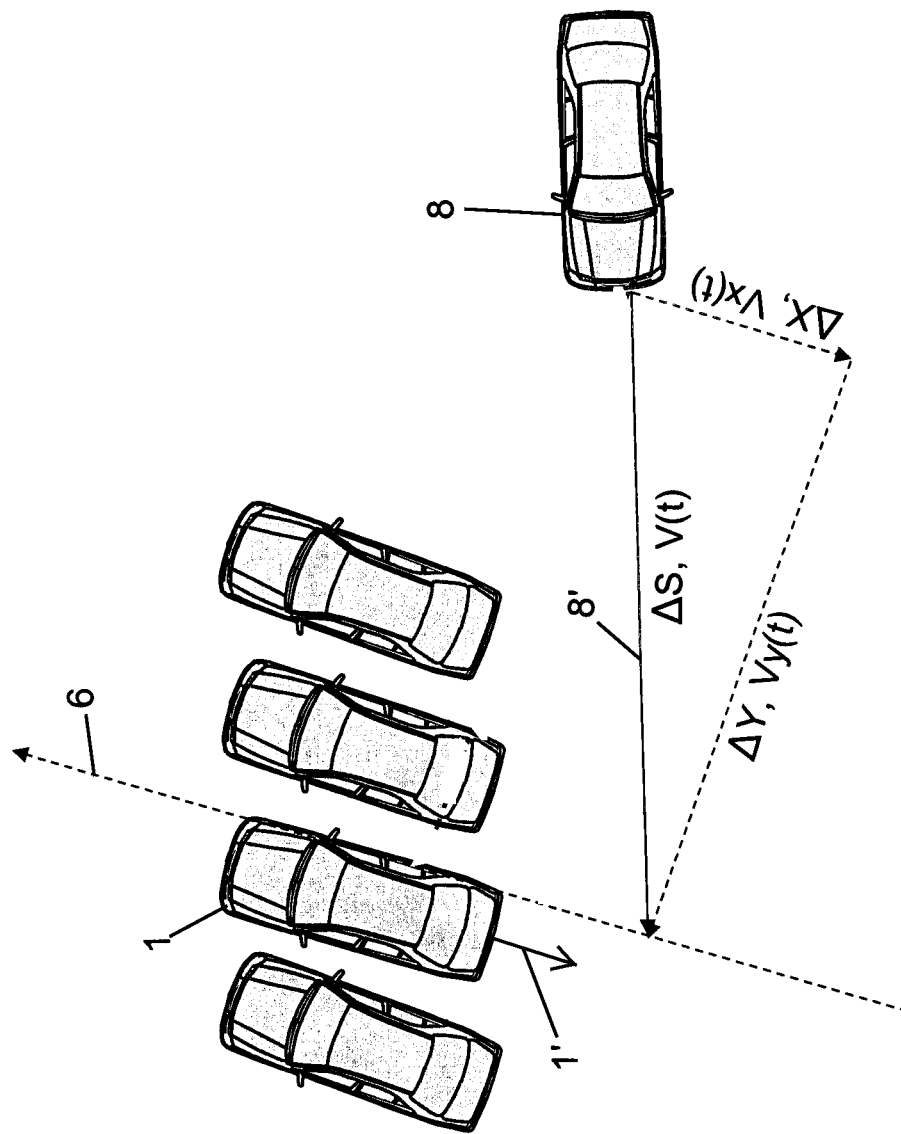
FIG. 3 is a top view diagram similar to FIG. 1, but especially showing a typical angled or diagonal parking situation.

The embodiment of the invention described here is especially also suitable for predicting potential collisions in typical diagonal or angled parking situations, for example a situation in which vehicles are parked at an angle within a range of +/−30° relative to perpendicular, instead of being parked exactly perpendicular to the driving lane behind the vehicles (for example see FIG. 3). More generally, such a situation involves a potential obstacle 8 approaching the subject vehicle 1 and its critical zone 2 at an oblique or non-perpendicular angle, whether or not the subject vehicle is parked in an angled parking situation. For example, FIG. 1 shows plural automobiles parked parallel to one another in a straight row, for example in a typical perpendicular parking situation. However, a crossing vehicle, representing a potential obstacle 8, is approaching the rear of the subject vehicle 1 at a non-perpendicular or oblique angle. This angle is considered relative to the longitudinal axis of the subject vehicle 1.

To detect the approaching potential obstacle 8, the system of the invention includes at least one sensor such as a radar sensor 3 arranged preferably at or near a rear corner of the subject vehicle 1. A respective side boundary of the critical zone 2 extends substantially along (or parallel near) a reference line 6 that runs forwardly from the sensor 3 parallel to the longitudinal axis of the subject vehicle 1. The sensor 3 and its arrangement will be described in further detail below.

In FIG. 1, the sensor angle or detected angle A(t) of the potential obstacle 8 is represented relative to the reference line 6, which extends through the sensor 3 parallel to the longitudinal axis of the subject vehicle 1. As the potential obstacle 8 approaches the subject vehicle 1 and its critical zone 2, the sensor 3 detects the potential obstacle 8 and its approaching motion, and the sensor then provides a data signal from which the obstacle and its motion can be tracked, monitored and evaluated. For example, in successive images or data frames, the position and motion of the potential obstacle 8 relative to the subject vehicle 1 are tracked and evaluated. This involves determining the relative distance D(t) of the potential obstacle 8 from the subject vehicle 1 (or especially from the sensor 3), and the detected angle A(t) of the potential obstacle 8 relative to the subject vehicle 1 (or especially relative to the reference line 6 of the sensor 3), as these values change over time, e.g. successively in the successive images or data frames captured by the sensor 3. Thus, this evaluation takes into account the speed and motion of the potential obstacle 8 as well as the speed and motion of the subject vehicle 1, because these all have an influence on the relative values A(t) and D(t).

This further allows the expected trajectory 8' of the potential obstacle 8 and the expected trajectory 1' of the subject vehicle 1 to be determined, relative to each other. The expected trajectory 8' of the potential obstacle 8 is determined by extrapolating the detected position and motion of the obstacle 8 based on the detected distance D(t) and detected angle A(t), and/or the X and Y components of the motion of the obstacle 8 (see the further discussion below), as they change over time, while factoring out the known motion of the subject vehicle 1. The expected trajectory 1' of the subject vehicle 1 is determined based on the known or detected speed Vs of the subject vehicle and the steering angle of the subject vehicle, for example as detected by a steering angle sensor 18 (see FIG. 4). The steering angle evaluation especially eliminates false positives relative to a system without such a steering angle evaluation, e.g. a system which assumes a straight rearward travel of the vehicle 1.

Based on these two predicted trajectories 1' and 8', the likelihood of a collision or crossing of the potential obstacle 8 into the moving critical zone 2 is determined. This can also be embodied as determining the likelihood that the two trajectories 1' and 8' will intersect one another at the critical coincident time. For example, this involves determining a probability value that characterizes the probability of a collision or intersection of the potential obstacle 8 with the moving critical zone 2. If this probability value exceeds a predefined threshold, then a warning is triggered and provided to the driver of the subject vehicle 1.

The evaluation of the motion of the potential obstacle 8 may further involve resolving or separating the motion of the potential obstacle 8 into respective components in the X-direction (parallel to the longitudinal axis of the subject vehicle 1 and the reference line 6) and the Y-direction (perpendicular to the X-direction), as represented in FIG. 1. Namely, the detected relative distance D(t) and detected relative angle A(t) can be evaluated to determine an X-component $\Delta X$ and a Y-component $\Delta Y$, which together give the distance $\Delta S$ along the trajectory 8', while evaluating the change of A(t) and D(t) over time can give a speed X-component Vx(t) and a speed Y-component Vy(t), which together give the approaching speed V(t) along the trajectory 8'. Thus, even when the potential obstacle 8 is approaching the critical zone 2 at an oblique angle, this embodiment feature of individually resolving or determining these directional components facilitates predicting the trajectory 8', and then further predicting the probability of a collision or crossing of the trajectory 8' of the potential obstacle 8 with the trajectory 1' of the subject vehicle 1 and its critical zone 2 at a critical coincident time. Of course, when the approach angle of the obstacle is perpendicular to the critical zone, then the values of $\Delta X$ and Vx(t) are simply zero, but the inventive system and method are especially advantageous with oblique approach angles whereby $\Delta X$ and Vx(t) have non-zero values.

Thus, the inventive method and system are especially also useful in angled or diagonal parking situations as shown in FIG. 3, for example in which vehicles are parked at a parking angle in a range of +/−30° relative to perpendicular, or especially at +30° or −30° relative to perpendicular. In such a situation, the potential obstacle or crossing vehicle 8 is also approaching at an oblique or non-perpendicular approach angle relative to the sensor reference line 6. Note that the approach angle in FIG. 3 is opposite the direction of the approach angle in FIG. 1. Correspondingly, the sensor angle or detected angle A(t) in the situation of FIG. 1 is greater than 90°, while the detected angle (not illustrated) in the situation of FIG. 3 is less than 90°. Nonetheless, the system and method according to the invention functions exactly the same to predict the expected trajectory 8' of the crossing vehicle 8 and the expected trajectory 1' of the subject vehicle 1, and to determine the probability of an intersection or collision as described above. Thus, also with an acute approach detected angle as in FIG. 3, this evaluation can determine the distance ΔS and the speed V(t) from the perpendicular directional components ΔY and ΔX as well as Vy(t) and Vx(t).

FIG. 3 also represents a situation in which the lateral field of view of the driver of the subject vehicle 1 is substantially blocked on both sides by other parked vehicles. This is especially a situation in which the inventive system and method are very advantageous to provide a warning to the driver sufficiently early so that the driver can appropriately react to a potential collision with an approaching vehicle 8 that has not yet been seen. This procedure also ensures that a warning is emitted early enough for the driver to react, also in the case of a potential obstacle, e.g. crossing vehicle, that approaches at a relatively high speed, which often represents a greater hazard than a slower approaching obstacle.

Referring to both of the FIGS. 1 and 3, the hazard represented by the potential obstacle 8 is determined relative to the critical zone 2 extending behind the subject vehicle 1 and thus representing the backing-up area of the subject vehicle 1. This hazard is, for example, determined and represented with reference to characteristic mathematical and/or physical observations and functional characterizations, and is a measure of the probability of a collision between the subject vehicle and the potential obstacle 8. If this hazard, i.e. the probability value, exceeds a predetermined critical threshold value, then a warning signal is generated to warn the driver about the hazard. Generating a warning signal means producing, releasing or triggering a warning signal.

Figure 4:
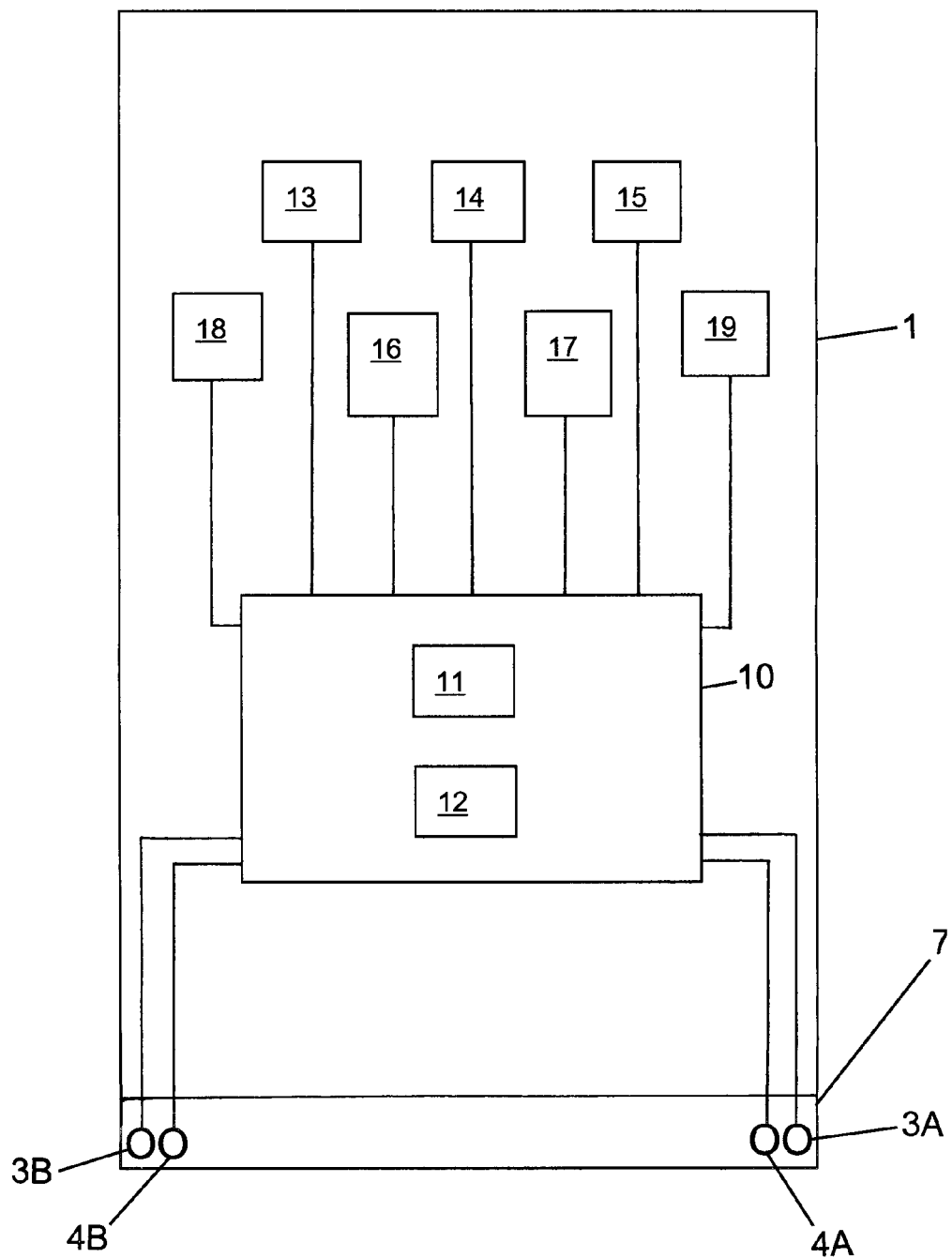
FIG. 4 is a schematic block diagram of the components of a system according to the invention in a subject vehicle.

Particularly, this warning can be realized by various warning signal emitters, for example as schematically represented in the system diagram of FIG. 4. For example, the warning can be realized as an optical warning emitted by an optical signaling device 13 such as a flashing light on the instrument panel, a haptic signaling device 14 such as a vibrator on the steering wheel, or an acoustic signaling device 15 such as a buzzer or signaling chime on the dashboard. Any one of these signaling devices 13, 14, and/or 15, or a combination thereof, alert the driver to the hazardous situation.

The warning can alternatively or additionally be realized by activating an automatic driving maneuver that prevents an imminent collision, e.g. by an automatic steering control 16 that intervenes in the steering of the vehicle, and/or an automatic brake and throttle control 17 that decelerates and stops the vehicle. Such automatic intervention in the driving maneuver control is preferably triggered when a collision probability exceeds a second threshold higher than the first warning threshold and/or when a collision is deemed highly probable and very soon to occur, i.e. with a very short "time-to-crossing" until the predicted occurrence of the collision. In a further embodiment of the invention, the optical, haptic or acoustic warning signal is combined with the automatic driving maneuver control.

It should further be understood that the critical zone 2 is merely a conceptual construct, and does not need to be embodied in carrying out the invention. Namely, the inventive method and system can be carried out without any construct or reference to a critical zone, but instead merely by evaluating the detected so angle A(t) and the detected distance D(t), or be evaluating the relative speed and relative position of the potential obstacle 8 relative to the expected reverse driving path 1' of the subject vehicle, in order to then determine the probability value that characterizes the likelihood of a collision or intersection of the expected trajectory 8' of the potential obstacle 8 with the expected trajectory 1' of the subject vehicle 1 at a critical coincident time, as described above. Namely, the borders of the critical zone 2 do not represent a yes/no critical threshold that triggers a warning of a collision, but instead a probability of collision and a time-to-crossing are determined, and the probability value can range from 0% to 100%. The boundaries of the critical zone 2 illustrated in FIG. 1 merely represent the expected or predicted trajectory path of the physical space of the subject vehicle itself as it is backing up, as well as a safety buffer zone extending behind the subject vehicle. The warning is triggered when the determined probability exceeds the predefined probability threshold, and not only when the approaching potential obstacle 8 actually crosses a boundary of the critical zone 2. Thus, the critical zone of the present invention is conceptually and practically different from "critical zones" used for triggering a warning in prior art systems and methods.

According to a particular embodiment, the evaluation can be carried out based on only the sensor data provided by the sensors 3A and/or 3B (and optionally 4A and/or 4B), by evaluating the detected distance D(t) and the detected angle A(t) as they change over time, e.g. in successive data frames from the sensor. The detected values A(t) and D(t) take into account the position and the motion of both the subject vehicle 1 and the potential obstacle 8, because these measurements determine the time-varying position of the obstacle 8 relative to the subject vehicle 1 (because the sensor moves along with the vehicle). This relative motion is determinative of the collision probability, regardless whether this relative motion involves motion of the vehicle 1, motion of the obstacle 8, or motion of both the vehicle 1 and the obstacle 8. In other words, it is also not crucial whether the stationary frame of reference is the parking lot driving surface, the vehicle 1 or the obstacle 8. Thus, the inventive system and method can be embodied to determine only a relative trajectory that takes into account the relative motion of both objects and determines whether a collision of the obstacle 8 with the vehicle 1 is probable regardless of the respective individual speeds and motions of the two objects.

Figure 2:
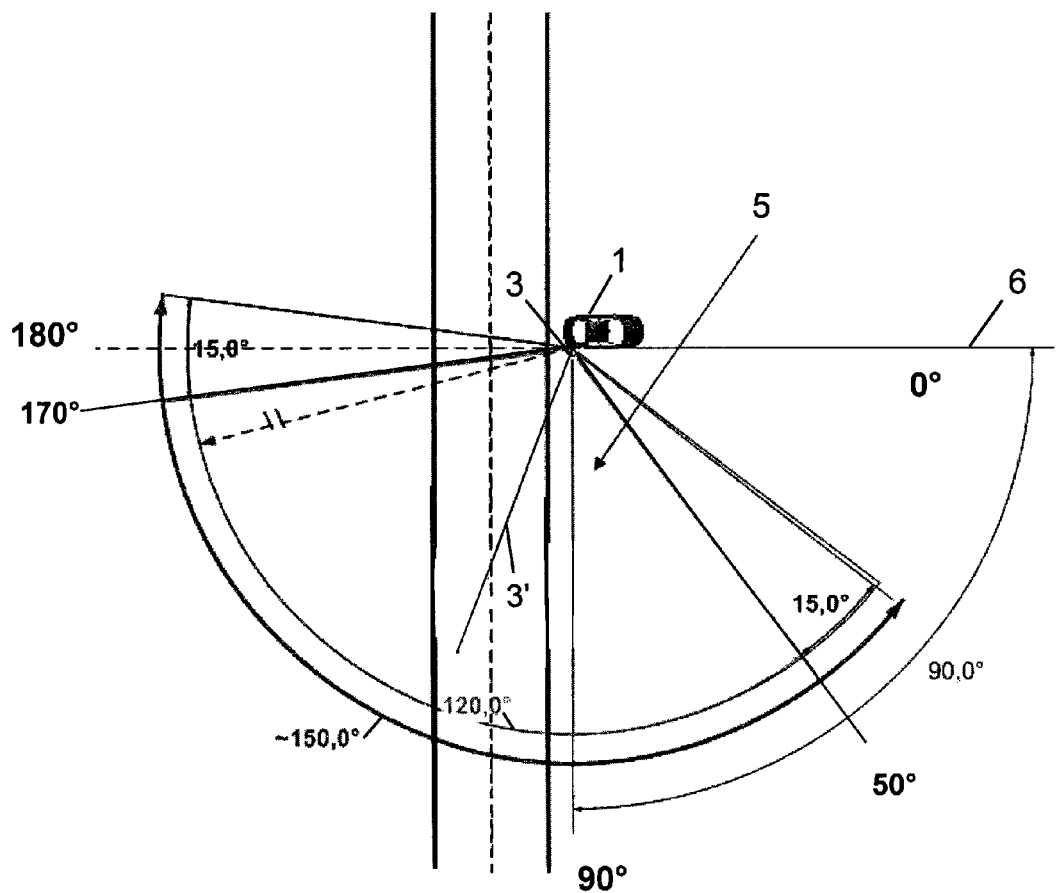
FIG. 2 is a top view diagram of the detection region of one of the sensors of the inventive system.

The sensor 3 is preferably a radar sensor 3, which preferably has a maximum sensing range of 30 meters to 60 meters, and especially preferably a sensing range of 50 meters. In a further preferred embodiment of the invention, a plurality, and preferably exactly two, radar sensors 3A and 3B are used. Particularly, as indicated schematically in the system diagram of FIG. 4, these two radar sensors 3A and 3B are installed or incorporated in or under the left and right corner portions of the rear bumper 7 of the subject vehicle 1. The sensing axis 3' of each sensor 3A and 3B is preferably oriented obliquely, laterally and toward the rear of the subject vehicle, for example at an angle of 110° relative to the forward reference line 6, or 20° relative to the perpendicular side line of the subject vehicle 1, as represented in FIG. 2. However, the orientation of the sensing axis of each sensor 3, 3A, 3B is entirely flexible, and can be selected differently for the sensor 3A on the right side and the sensor 3B on the left side, for example. Namely, the orientation of each sensor is freely selectable, but FIG. 2 represents a preferred orientation to provide the best results according to the invention. It should further be understood that using a plurality of sensors is optional, i.e. the inventive method and system can also be embodied with only a single sensor for achieving all of the inventive functions.

FIG. 2 also schematically represents the detection region 5 of a representative sensor 3 which covers the rearward and lateral areas adjacent to the subject vehicle 1. The total angular range of the detection region 5 is preferably greater than 130°, and especially greater than 135°, and most preferably an angular range of 150°. In a further preferred embodiment, the sensor 3 has a central angular range with higher sensitivity and higher angular resolution, for example in an angular range of 120° centered on the sensing axis 3'. Thus, with the sensing axis 3' oriented at 110° relative to the reference line 6, the higher sensitivity region extends from an angle of 50° to an angle of 170°. In respective 15° ranges to both sides of the higher sensitivity region, the sensor 3 provides lower sensitivity and lower resolution regions, for example spanning from 35° to 50°, and from 170° to 185°, relative to the reference line 6.

According to a further embodiment of the invention, the inventive system and method shall provide warnings regarding potential obstacles other than and in addition to vehicles crossing behind the subject vehicle. Particularly, the pertinent detectable obstacle objects shall also include pedestrians. An additional sensor or pair of sensors 4A and 4B (see FIG. 4) can be provided for improved detection of pedestrians. For this, the sensors 4A and 4B are preferably of a different type (e.g. ultrasound or infrared sensors) or have different sensing characteristics relative to the radar sensors 3A and 3B. Pedestrians moving below a certain minimum speed are considered to be non-critical, because it is generally expected that they will see the backing-up subject vehicle and stop walking. However, a pedestrian who is running, or a person riding a bicycle (also considered a pedestrian) and traveling at above a certain minimum threshold speed will be regarded as critical, because such a person might not stop in time to avoid a collision. Thus, if a pedestrian (or bicyclist) is detected and determined to be traveling at greater than a minimum threshold speed of e.g. 3 or 4 or 5 km/h, and the hazard probability value exceeds the predetermined critical threshold value as explained above, then a warning will be generated and provided to the driver. Otherwise, if the speed is below the minimum speed threshold, and/or the hazard probability value is below the predetermined threshold, then no warning will be triggered. Even for detecting vehicles as potential obstacles 8, preferably the detected obstacle must exceed a minimum threshold speed in a range from 1 to 8 km/h, preferable 3 to 5 km/h, before it is considered a critical obstacle that must be evaluated for triggering a possible collision hazard warning.

Furthermore, in a preferred embodiment of the invention, the method described herein will only be activated when the subject vehicle is driving in reverse (e.g. backing-up) with a speed greater than zero but below a prescribed maximum threshold value. Namely, when the vehicle is driving in reverse above the threshold speed value, then it is assumed that the driver is purposely driving in reverse at a higher speed after having visually assessed the safety of such a maneuver, i.e. after visually determining whether there are any potential obstacles. In this regard, the maximum threshold speed value is set between 5 and 20 km/h, and preferably at about 12 km/h (e.g. +/−1 km/h). As a further option, the method is only activated when the subject vehicle is in reverse gear or standing still.

FIG. 4 schematically represents the components of a system according to the invention as respective "black box" or block elements. The components themselves may be conventionally known, and can have any conventionally known structure and function. The present invention involves the particular combination, arrangement and interaction of the known components, and/or further modification of the known components to achieve the features described herein, such as the angular range and the detection range of the sensors, etc. FIG. 4 schematically shows the components of the system installed in the subject vehicle 1.

The radar sensors 3A and 3B, as well as the pedestrian sensors 4A and 4B are installed in or under the rear bumper 7 of the subject vehicle 1. The sensors are connected for signal transmission (e.g. by electrical wires or a data bus) to an evaluation unit 10 that preferably includes a computer processor 11 and a storage memory 12. The computer processor 11 may be any processor unit that is able to carry out calculations and execute a sequence of particular prescribed steps and functions according to a computer program. The processor may either be a general purpose computer programmed especially according to the invention, or a special purpose computer that is specifically designed and constructed to execute certain procedures according to the invention via software and/or hardware.

The storage memory 12 can be any computer readable medium, which may comprise, for example, one or more of any read-only memory, any random access memory, any hard disc memory, any removable disc memory, any optical disc memory, any magnetic disc memory, or any hardware memory chip embodying a static memory or a dynamic memory. The memory 12 stores a program including a sequence of steps to carry out the evaluation of data signals from the sensors 3A, 3B, 4A and 4B, and optionally from a steering angle sensor 18 providing a signal indicative of the steering angle of the subject vehicle 1, and a driving speed sensor 19 providing a signal indicative of the driving speed of the subject vehicle 1. The program stored in the memory 12 is operative for evaluating the received data to determine the probability value as described herein, and to compare various data values to predefined thresholds, and to compare the determined probability value to a predefined threshold. The predefined thresholds may respectively be fixed values or adjustable values. The program stored in the memory 12 is further for generating a warning signal according to the method disclosed herein. The warning signal is provided to one or more of the optical signaling device 13, the haptic signaling device 14, the acoustic signaling device 15, the steering control unit 16 and/or the brake and throttle control unit 17, which are each connected for receiving signals from the evaluation unit 10.

The processor 11 of the evaluation unit 10 is operative to load and execute the program stored in the memory 12, for carrying out the various steps and functions of the inventive method as disclosed herein. As an alternative to the computerized evaluation unit 10, the functions thereof can be executed in analog and/or digital circuitry that carries out a specific hardware-based processing of the input data signals to achieve the output warning signal or signals as disclosed herein. The evaluation in the evaluation unit 10 can also be carried out partially through software and computerized means, and partially through hardware. The evaluation unit can be split up among plural physical devices or units, which thus represents an evaluation arrangement with one or more units.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

What is claimed is:

1. A method of warning a driver of a subject vehicle about a potential obstacle crossing behind said subject vehicle, comprising the steps:
   a) with at least one sensor mounted on said subject vehicle, detecting a potential obstacle in a detection region extending behind and beside said subject vehicle, and producing sensor data representative of said potential obstacle detected by said at least one sensor;
   b) in an evaluation arrangement mounted in said subject vehicle, evaluating said sensor data, and from said sensor data determining a relative position and a relative speed of said potential obstacle relative to said subject vehicle;
   c) in said evaluation arrangement, determining, from said relative position and said relative speed, a probability that said potential obstacle will enter a critical zone encompassing said subject vehicle and extending a predetermined distance behind said subject vehicle;
   d) in said evaluation arrangement, comparing said probability to a probability threshold, and generating a warning signal if said probability exceeds said probability threshold.

2. The method according to claim 1, further comprising acquiring a speed signal indicative of a vehicle speed of said subject vehicle, and evaluating said relative speed with reference to said vehicle speed to determine an obstacle speed of said potential obstacle.

3. The method according to claim 2, further comprising detecting with said sensor and evaluating in said evaluation arrangement a detected angle at which said potential obstacle relatively approaches said sensor on said subject vehicle, and evaluating said detected angle and said obstacle speed to determine two orthogonal speed components including a first speed component parallel to a longitudinal axis of said subject vehicle and a second speed component perpendicular to said longitudinal axis.

4. The method according to claim 1, further comprising detecting with said sensor and evaluating in said evaluation arrangement a detected angle at which said potential obstacle relatively approaches said sensor on said subject vehicle, and evaluating said detected angle and said relative speed to determine two orthogonal speed components including a first speed component parallel to a longitudinal axis of said subject vehicle and a second speed component perpendicular to said longitudinal axis.

5. The method according to claim 1, wherein said determining of said probability in said step c) comprises determining a first predicted trajectory of said potential obstacle from said relative position and said relative speed.

6. The method according to claim 5, further comprising acquiring a steering angle signal indicative of a steering angle of said subject vehicle, and further comprising acquiring a speed signal indicative of a vehicle speed of said subject vehicle, and wherein said determining of said probability in said step c) further comprises determining a second predicted trajectory of said subject vehicle from said steering angle and said vehicle speed and determining whether said first predicted trajectory crosses said second predicted trajectory at a coinciding time.

7. The method according to claim 1, wherein said predetermined distance to which said critical zone extends behind said subject vehicle is up to 6 m.

8. The method according to claim 1, further comprising emitting said warning signal as at least one of an optical signal, a haptic signal and an acoustic signal to warn said driver.

9. The method according to claim 8, further comprising triggering, with said warning signal, an automatic driving maneuver control of said subject vehicle.

10. The method according to claim 1, further comprising comparing said relative speed to a minimum speed threshold, and only generating said warning signal if said relative speed exceeds said minimum speed threshold.

11. The method according to claim 1, further comprising acquiring a speed signal indicative of a vehicle speed of said subject vehicle, comparing said vehicle speed to a maximum speed threshold, and only generating said warning signal if said vehicle speed is below said maximum speed threshold.

12. The method according to claim 1, wherein said potential obstacle is approaching said critical zone at an approach angle relative to a longitudinal axis of said subject vehicle, and said approach angle can take any and all values from 60° to 120° relative to said longitudinal axis.

13. The method according to claim 1, wherein said sensor has an angular detection range spanning at least 120°.

14. The method according to claim 1, wherein said sensor is oriented with a sensing axis thereof directed at an angle of 110° relative to a reference line extending forwardly parallel to a longitudinal axis of said subject vehicle.

15. The method according to claim 1, wherein said at least one sensor comprises a radar sensor for sensing said potential obstacle comprising another vehicle.

16. The method according to claim 15, wherein said at least one sensor further comprises another sensor of a different type or having different sensing characteristics relative to said radar sensor, for sensing said potential obstacle comprising a pedestrian.

17. A method of warning a driver of a subject vehicle about a potential obstacle crossing behind said subject vehicle, comprising the steps:
   a) while said subject vehicle is moving in a rearward direction, with a sensor mounted on said subject vehicle detecting a potential obstacle in a detection region extending behind and beside said subject vehicle, and producing sensor data representative of said potential obstacle detected by said sensor;
   b) in an evaluation arrangement mounted in said subject vehicle, evaluating said sensor data to determine a relative distance and a relative detected angle of said potential obstacle relative to said sensor mounted on said subject vehicle;
   c) in said evaluation arrangement, monitoring a first progression of said relative distance over time and a second progression of said relative detected angle over time;
   d) in said evaluation arrangement, determining from said first progression and said second progression a probability that said potential obstacle will intersect a critical zone encompassing said subject vehicle and extending a predetermined distance behind said subject vehicle; and e) in said evaluation arrangement, comparing said probability to a probability threshold, and generating a warning signal if said probability exceeds said probability threshold.

18. The method according to claim 17, wherein said probability is determined in said step d) from only said first progression and said second progression without taking any other input data into account.

* * * * *